United States Patent [19]

Nakano

[11] 4,201,459
[45] May 6, 1980

[54] BRAKING DEVICE FOR FOCAL PLANE SHUTTER

[75] Inventor: Yoshiyuki Nakano, Tokyo, Japan

[73] Assignee: Nippon Kogaku K.K., Tokyo, Japan

[21] Appl. No.: 25,083

[22] Filed: Mar. 29, 1979

[30] Foreign Application Priority Data

Mar. 30, 1978 [JP] Japan .................................. 53/37302

[51] Int. Cl.² .......................... G03B 9/40; G02B 15/03
[52] U.S. Cl. .................................... 354/147; 354/246; 354/252
[58] Field of Search .................. 354/48, 147, 245–249, 354/251–252

[56] References Cited

U.S. PATENT DOCUMENTS

| | | | |
|---|---|---|---|
| 3,840,885 | 10/1974 | Yoshizaki | 354/252 X |
| 3,886,572 | 5/1975 | Onda et al. | 354/252 |
| 3,952,317 | 4/1976 | Galbraith, Jr. | 354/246 X |
| 3,964,081 | 6/1976 | Pickering | 354/246 |
| 4,104,665 | 8/1978 | Tadashi et al. | 354/147 X |

Primary Examiner—L. T. Hix
Assistant Examiner—Thomas H. Taroza
Attorney, Agent, or Firm—Fitzpatrick, Cella, Harper & Scinto

[57] ABSTRACT

A braking device for focal plane shutter in a photographic camera, in which the braking device has a braking function in its reciprocating motion. The braking device is moved forward by a shutter opening member near the end of aperture opening by the shutter opening member, and is moved backward by the shutter closing member near the end of aperture closing. During its reciprocating movement, braking force is applied to the shutter opening and closing members, and, in association with forward movement of the shutter opening and closing members, synchro-switch contacts are closed, while they are opened in association with the backward movement thereof. Further, in association with return of the aperture opening member to its original position at the shutter charging, the braking device is made returnable to its initial position.

6 Claims, 3 Drawing Figures

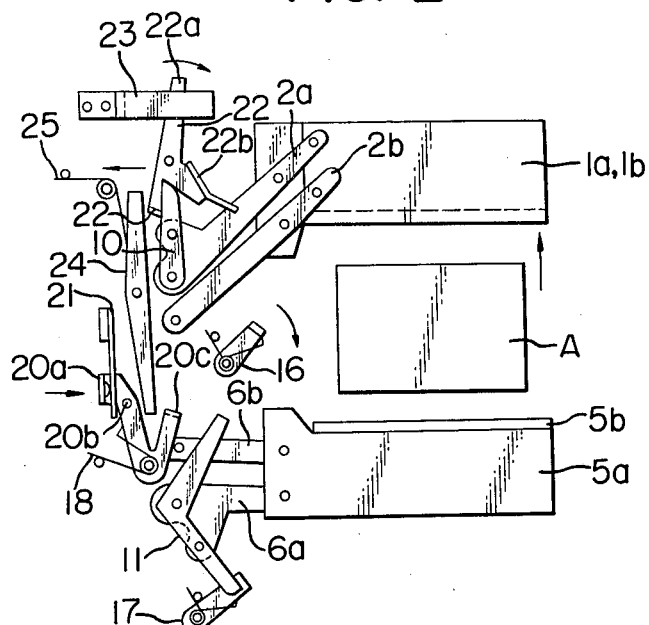
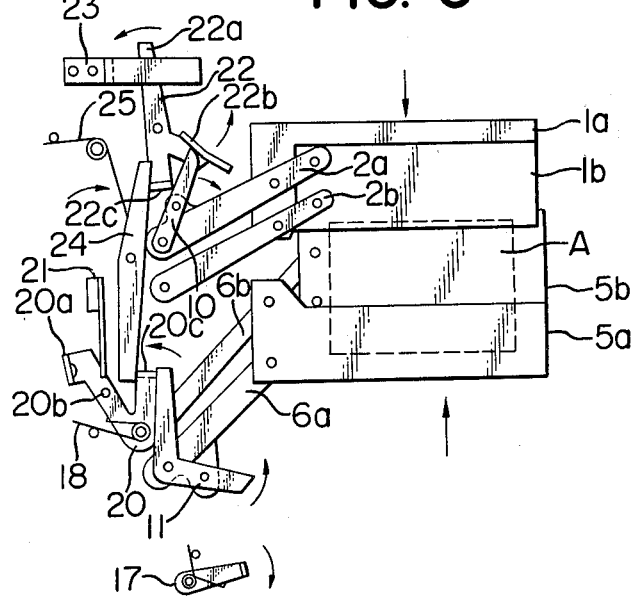

BRAKING DEVICE FOR FOCAL PLANE SHUTTER

BACKGROUND OF THE INVENTION

This invention relates to a braking device for a focal plane shutter in a photographic camera.

For a braking device which prevents impact force, noise, and bouncing to occur in the shutter opening and closing members at the time of stoppage of the shutter release operation, there has so far been known such a device that absorbs the energy of motion in each of the shutter opening and closing members by means of a frictional brake. Such braking device, however, cannot again absorb the energy of motion, unless it is reinstated to its original position before the next shutter opening and closing operations take place. Hence, it has been the general practice to return the braking device to its original position at the time of shutter charging. This results in an increase in the load when shutter charging takes place.

On the other hand, when the members to be controlled by this frictional brake are used for turning-on of a synchro-switch (X contact), chattering of the synchro-switch caused by impact from collision of the two contacts of the switch can be prevented. Therefore, adoption of this system is most effective in flashing a speed light without failure and with exact timing. In this system, however, since the synchro-switch is kept turned on during a period of time from completion of the photographic operation to re-charging of the shutter, there may take place such a situation that a trigger capacitor for the speed light cannot be properly charged. In order to avoid such disadvantage, there has so far been known such a device, in which a switch to be turned on at the shutter release and turned off at the completion of the photographic operation (i.e., at the time of completion of the operation of the shutter opening and closing members) is connected in series with the synchro-switch. This switch is turned on and off in association with operation of the mirror system, or with the operation of the shutter release button. This device, however, is not also perfectly free from defect in that not only the number of switches to be provided increases by one, but also the speed light flashes simultaneously with turning-on of the switch on account of the floating capacitance of the wiring connection between the synchro-switch and the additional switch.

SUMMARY OF THE INVENTION

It is a primary object of the present invention to provide a braking device for a focal plane shutter which performs braking action only at the time of stoppage of the operation due to release of the shutter opening and closing members and which does not impose unnecessary load on the shutter charging operation.

It is a secondary object of the present invention to provide a braking device which is effectively interlocked with a synchro-switch to prevent erroneous flashing of the speed light from taking place.

In order to attain the abovementioned objects, the present invention contemplates the braking device for controlling the shutter opening member to be usable also as the braking device for the shutter closing member. Also, according to the present invention, the braking device is constructed in such a manner that the synchro-switch may be turned on and off by these shutter opening and closing members to be controlled by the braking device.

BRIEF DESCRIPTION OF ACCOMPANYING DRAWINGS

FIG. 1 is a perspective view showing one embodiment of the present invention; and FIGS. 2 and 3 are front views for explaining the operations of the focal plane shutter shown in FIG. 1.

DESCRIPTION OF THE PREFERRED EMBODIMENTS

Figure 1:
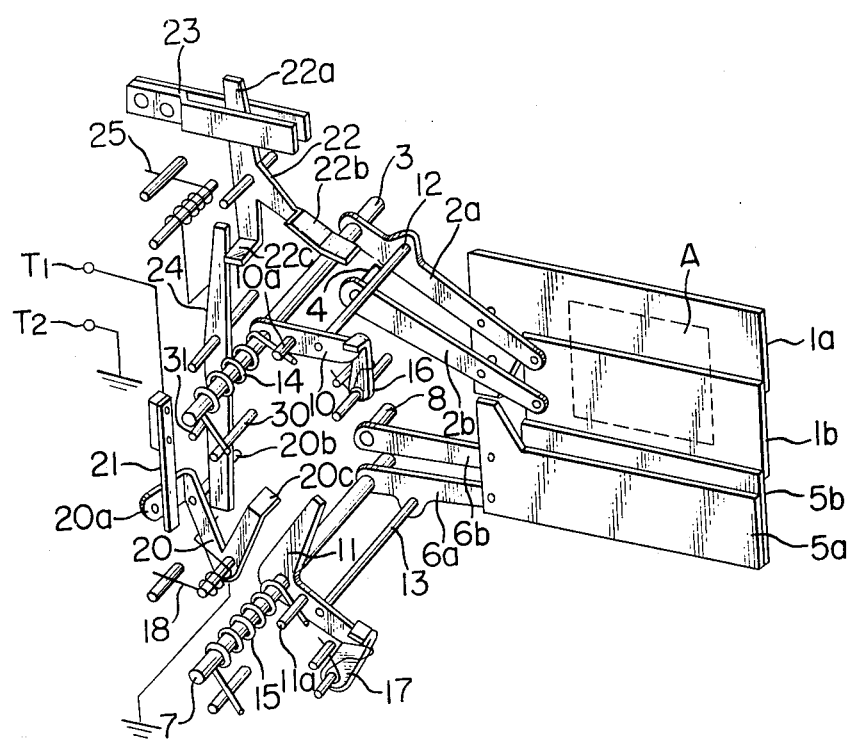

The focal plane shutter is classified into two major groups, i.e., a horizontally running screen type focal plane shutter, and a vertically running blade type focal plane shutter. FIG. 1 indicates, as one embodiment, the vertically running blade type focal plane shutter.

A blade driving device for the focal plane shutter consists of a charging mechanism for the front blade group and the rear blade group, a mechanism to retain each of the blade groups at their charging position and to release the retaining mechanism, a mechanism to absorb the impact force generated at the time of stoppage of each blade group upon completion of the shutter operation, and a mechanism to actuate the synchro-switch.

In the drawing, the front blades 1a and 1b for opening an aperture A, which forms a light path extending from a photo-taking lens to the film surface, are held in a position for parallel movement by a first link 2a for the front blade, which link oscillates about a shaft 3 as the center of its oscillation and a second link 2b for the front blade, which link oscillates about a shaft 4 as the center of its oscillation. The rear blades 5a and 5b to close the aperture A are also held in a position for parallel movement by a first link 6a for the rear blade, which link oscillates about a shaft 7 as the center of its oscillation and a second link 6b for the rear blade, which oscillates about a shaft 8 as the center of its oscillation.

A front blade drive lever 10 and a rear blade drive lever 11 oscillates on the pivot of the shafts 3 and 7, respectively, and are respectively joined to the front blade first link 2a and the rear blade first link 6a through respective connecting rods 12 and 13. The front blade drive lever 10 is also joined with a front blade drive spring 14 through a pin 10a, while the rear blade drive lever 11 is connected with a rear blade drive spring 15 through a pin 11a.

A shutter charging lever (not shown) is interlocked with the shutter charging operation to cause the front blade and rear blade drive levers 10 and 11 to oscillate in the clockwise direction. In this instance, therefore, the front blade group 1a and 1b and the rear blade group 5a and 5b respectively move to their respective positions in FIG. 1, whereby the front blades 1a and 1b close the aperture, and the rear blades 5a and 5b lower down beneath the aperture.

On the other hand, the front and rear blade drive springs 14 and 15 are biased in the clockwise direction to accumulate their force in the counter-clockwise direction. When the shutter charging is completed, a front blade hook 16 is engaged with the front blade drive lever 10 and a rear blade hook 17 is engaged with the rear blade drive lever 11, after which the shutter charging lever returns to its original position.

A synchronous lever 20 which is clockwisely energized by a spring 18 is made of an electrically conductive material and is grounded. One end 20a of this synchronous lever 20 constitutes one of the contact pieces of the shynchro-switch. A contact 21 connected to a terminal T₁ constitutes the other contact piece of the synchro-switch. Since a terminal T₂ is grounded, the synchro-switch is connected between the terminals T₁ and T₂.

A sliding part 22a of an oscillatable brake lever 22 is clamp-held between a pair of braking plates 23 with an appropriate degree of friction. The braking plates 23 are of such a size that they sufficiently cover a stroke of the sliding part 22a to perform its frictional sliding to cause the front and rear blade groups 1a, 1b, 5a, and 5b to stop their operations, as will be described hereinafter. A bent portion 22b of the brake lever 22 is made engageable with the front blade drive lever 10, and is counter-clockwisely rotated by the front blade drive lever 10 at the time of shutter charging to cause the brake lever 22 to be placed at its initial position. A hook portion 22c of the brake lever 22 is also engaged with the front blade drive lever 10. An interlocking lever 24 is engaged at its one end with this hook portion 22c. The other end of this interlocking lever 24 is so made that it is engageable with a pin 20b of the synchronous lever 20 or a hook portion 20c thereof.

When the brake lever 22 is at its initial position, the synchronous lever 20 is oscillated counter-clockwisely by the interlocking lever 24, whereby the synchro-switch is in an "off" state, and the spring 18 is brought to such a situation that cannot at all be effective against the frictional force between the sliding part 22a and the braking plates 23, because the spring 18 is only of sufficient strength to turn on the synchro-switch contacts.

In the following, operations of the braking device for the focal plane shutter according to the present invention will be explained. FIG. 1 shows a state in which shutter charging has been complated. When the front blade hook 16 is released by depression of a shutter release button (not shown), the front blade drive lever 10 oscillates counter-clockwisely by force of the front blade drive spring 14 to cause the front blades 1a and 1b to move upward as viewed in the drawing, through the connecting rod 12 and links 2a and 2b, whereby the aperture A is opened and exposure of the film surface starts. At the near end of the aperture opening by the front blades 1a and 1b, the front blade drive lever 10 is engaged with the hook portion 22c of the brake lever 22, by the energy of motion of which the brake lever 22 is oscillated clockwisely (FIG. 2 shows this operative state). At this instant, since the sliding part 22a frictionally slides with respect to the braking plates 23, energy of motion of these front blade group 1a and 1b, the lever 10, and so forth is absorbed, and these members stop their movement smoothly. In this consequence, any shock to be caused at the time of stoppage of the front blade group 1a and 1b is properly absorbed.

On the other hand, since the interlocking lever 24 oscillates counter-clockwisely by the hook portion 22c of the brake lever 22, the synchronous lever 20 oscillates clockwisely by the spring 18 and the synchronizing contact is turned on.

At this time, since the brake lever 22 and the interlocking lever 24 oscillate, while being subjected to braking action, the synchronous lever 20 is also braked to oscillate slowly. Accordingly, chattering of the synchro-switch is prevented, and bouncing of the front blade group 1a and 1b is also prevented by the braking action of the frictional brake, hence there is no possibility of the synchro-switch being turned off again.

Incidentally, a spring 25 is provided for preventing the synchro-switch from turning on by the clockwise oscillation of the synchronous lever 20 prior to the shutter release operation.

Next, when the rear blade hook 17 is released after lapse of a shutter timing as set, the rear blade lever 11 oscillates counter-clockwisely by the force of the rear blade drive spring 15, as the result of which the rear blades 5a and 5b start to close the aperture A through the connecting rod 13 and the links 6a and 6b. At the near end of the aperture closure action, the rear blade driving lever 11 contacts the hook portion 20c of the synchronous lever 20 to cause it to oscillate counter-clockwisely. On account of this, the synchro-switch is turned off. Since the interlocking lever 24 oscillates clockwisely through the hook portion 20c, the brake lever 22 oscillates counter-clockwisely through the hook portion 22c, and the energy of motion of the rear blade group 5a and 5b is absorbed. Consequently, impact force at the time of stoppage is absorbed. FIG. 3 shows the operative state at this time. At this operation, the clockwise oscillation of the interlocking lever 24 is interlocked with oscillation of the front blade drive lever 10, which has so far been depressed in the counter-clockwise direction by the spring 14, for a certain definite quantity in the clockwise direction through the brake lever 22 against the force of the spring 14. Accordingly, the front blade drive spring 14 is charged to a predetermined extent, and the front blade group 1a and 1b moves downward for a certain definite distance to close a part of the aperture. As the result, the aperture A is perfectly closed by both front blade group 1a and 1b and the rear blade group 5a and 5b. By these charging and closing actions, not only the working quantity decreases for charging the front blade drive spring 14 at the time of the next shutter charging, but also the front blades 1a and 1b slightly close the aperture, hence erroneous exposure by bouncing of the rear blade group 5a and 5b, if such should happen, can be prevented.

By the way, it might be apprehended that, when a photographer hinders movement of the rear blade group 5a and 5b by mistake (e.g., when the photographer opens the rear cover of the camera body and inserts his finger into the aperture, for example, the synchro-switch is not turned off due to shortage in energy of motion of the rear blade drive lever 11, i.e., shortage in oscillation of the synchronous lever 20. In such situation, the clockwise oscillation of the front blade drive lever 10 at the time of shutter charging causes the brake lever 22 to move toward its initial position through the bent portion 22b, and the interlocked lever 24 to oscillate in the counter-clockwise direction. By this measure, the synchro-switch is turned off without failure, and the brake lever 22 is returned to its original position. It might also occur that there will be a difference between the degree of oscillation of the brake lever 22 in the clockwise direction and that in the counter-clockwise direction thereof. In such occasion, the energy of motion of the rear blade group is reduced, i.e., the oscillation extent of the brake lever 22 in the counter-clockwise direction is reduced, so that the brake lever 22 may be oscillated to some extent in the counter-clockwise direction without failure by the front blade drive lever 10 at the time of the shutter charging, whereby its initial position can be secured, and the braking action and the timing of the synchro-switch can be stabilized.

In the illustrated embodiment, pins 30 and 31 serve as the restricting members to prevent the front and rear blade groups from overrunning. In other words, such overrunning is avoided by restrictive oscillation of the interlocking lever 24.

It is further possible that the frictional brake be substituted by an air dumper to impart the braking action in both back and forth movement, thereby attaining the intended effect. The synchro-switch may also be turned on and off in association with the brake lever 22, for the lever 22 reciprocatively moves at the time of braking both the front blade group and the rear blade group, hence it has two different positions.

As stated in the foregoing, the braking device for the focal plane shutter according to the present invention is so constructed that it has braking means having a braking action in both back and forth movements, the braking of the shutter opening member being performed in its forward movement and the braking of the shutter closing member being performed in its backward movement, hence unnecessary load is not be imposed at the time of the shutter charging.

Following movement of this braking means, since the synchro-switch is turned on and off in association with the member to move under braking action of the braking means, undesirable chattering of the synchro-switch can be prevented. Also, since the synchro-switch is turned on near the end of operation of the front blade group, and is turned off near the end of operation of the rear blade group, there is no necessity for providing any additional switch as has been done heretofore, whereby erroneous flashing of the speed light can be avoided.

I claim:

1. A focal plane shutter device for a photographic camera comprising:
   (a) an exposure aperture;
   (b) a first shutter blade which is movable from a closed position to close said aperture to an open position to open said aperture;
   (c) a second shutter blade which is movable from said open position to open said aperture to said closed position to close said aperture;
   (d) operating means including a first driving member to drive said first shutter blade from said closed position to said open position, and a second driving member to drive said second shutter blade from said open position to said closed position subsequent to operation of said first shutter blade by said first driving member; and
   (e) braking means including a reciprocating member disposed to be displaced in one direction in association with said first driving member immediately before termination of movement of said first driving member at the time of driving said first shutter blade, and to be displaced in another direction in association with said second driving member immediately before termination of movement of said second driving member at the time of driving said second shutter blade, and a braking member provided to absorb energy of motion of said reciprocating member at the time of displacement of said reciprocating member.

2. A focal plane shutter device as set forth in claim 1, further comprising:
   synchro-switch contacts; and
   switching means provided in association with said operating means in a manner to close said synchro-switch contacts when said first shutter blade is driven toward said open position and to open said synchro-switch contacts when said second shutter blade is driven to said closed position.

3. A focal plane shutter device as set forth in claim 2, wherein said switching means includes an actuating member which is interlocked with said second driving member and is engageable with said synchro-switch contacts.

4. A focal plane shutter device as set forth in claim 1, further comprising:
   synchro-switch contacts; and
   switching means provided in association with said reciprocating member in a manner to close said synchro-switch contacts when said first shutter blade is driven toward said open position and to open said synchro-switch contacts when said second shutter blade is driven toward said closed position.

5. A focal plane shutter device as set forth in claim 1, wherein said braking member is provided in frictional engagement with said reciprocating member and is fixed on said shutter device and has a size sufficiently covering an area which said reciprocating member displaces.

6. A focal plane shutter device as set forth in claim 1, wherein said first driving member includes energizing means to energize said first driving member in the moving direction of said first driving member when said first shutter blade is driven, said energizing means being so constructed and arranged that a part of its energizing force is accumulated in association with displacement of said reciprocating member to said other direction.

* * * * *